United States Patent
Franklin

(10) Patent No.: US 12,034,691 B2
(45) Date of Patent: Jul. 9, 2024

(54) SYSTEM AND METHOD FOR FACILITATING SOCIAL NETWORKING AMONG USERS

(71) Applicant: Amberlei Ann Franklin, Oakland, CA (US)

(72) Inventor: Amberlei Ann Franklin, Oakland, CA (US)

(73) Assignee: Amberlei Ann Franklin

( * ) Notice: Subject to any disclaimer, the term of this patent is extended or adjusted under 35 U.S.C. 154(b) by 78 days.

(21) Appl. No.: 17/748,123

(22) Filed: May 19, 2022

(65) Prior Publication Data

US 2022/0377038 A1    Nov. 24, 2022

Related U.S. Application Data

(60) Provisional application No. 63/190,715, filed on May 19, 2021.

(51) Int. Cl.
*H04L 51/222* (2022.01)
*G06Q 50/00* (2012.01)
*H04L 51/52* (2022.01)

(52) U.S. Cl.
CPC ........... *H04L 51/222* (2022.05); *G06Q 50/01* (2013.01); *H04L 51/52* (2022.05)

(58) Field of Classification Search
None
See application file for complete search history.

(56) References Cited

U.S. PATENT DOCUMENTS

| | | | | |
|---|---|---|---|---|
| 9,049,259 | B2* | 6/2015 | Rathod | H04L 65/403 |
| 9,787,617 | B2* | 10/2017 | Ciavatta | H04L 51/08 |
| 10,206,062 | B2* | 2/2019 | Attar | H04W 48/08 |
| 11,175,808 | B2* | 11/2021 | Frind | G06N 5/04 |
| 2014/0258260 | A1* | 9/2014 | Rayborn | G06Q 50/10 707/707 |
| 2017/0289211 | A1* | 10/2017 | Bosworth | G06Q 50/01 |
| 2019/0108690 | A1* | 4/2019 | Mølmann | B60N 99/00 |
| 2020/0205111 | A1* | 6/2020 | Burrell | H04W 4/023 |

OTHER PUBLICATIONS

Jeon "System And Method For Preventing Losing Pets", KR 20160038258 (Year: 2016).*
Xu et al. "Study of Factors Affecting Readability of Printed QR Codes", Spring 2014 Visual Communications Journal (Year: 2014).*

* cited by examiner

*Primary Examiner* — Saptarshi Mazumder
(74) *Attorney, Agent, or Firm* — Jason C. Cameron

(57) ABSTRACT

A system and method for facilitating social networking among users is disclosed. The method includes a user data and one or more preferences from each of a plurality electronic devices associated with a plurality of users and receiving a request from a registered user associated with a registered plurality of users to find a potential interested user. The method further includes identifying one or more potential interested users at real-time based on a location of the user, the received user data, the received one or more preferences and the received request and generating one or more AR icons at real-time. Further, the method includes superimposing the generated one or more AR icons on one or more images and one or more videos at real-time and outputting the one or more images and one or more videos to the user upon superimposing the one or more AR icons.

20 Claims, 7 Drawing Sheets

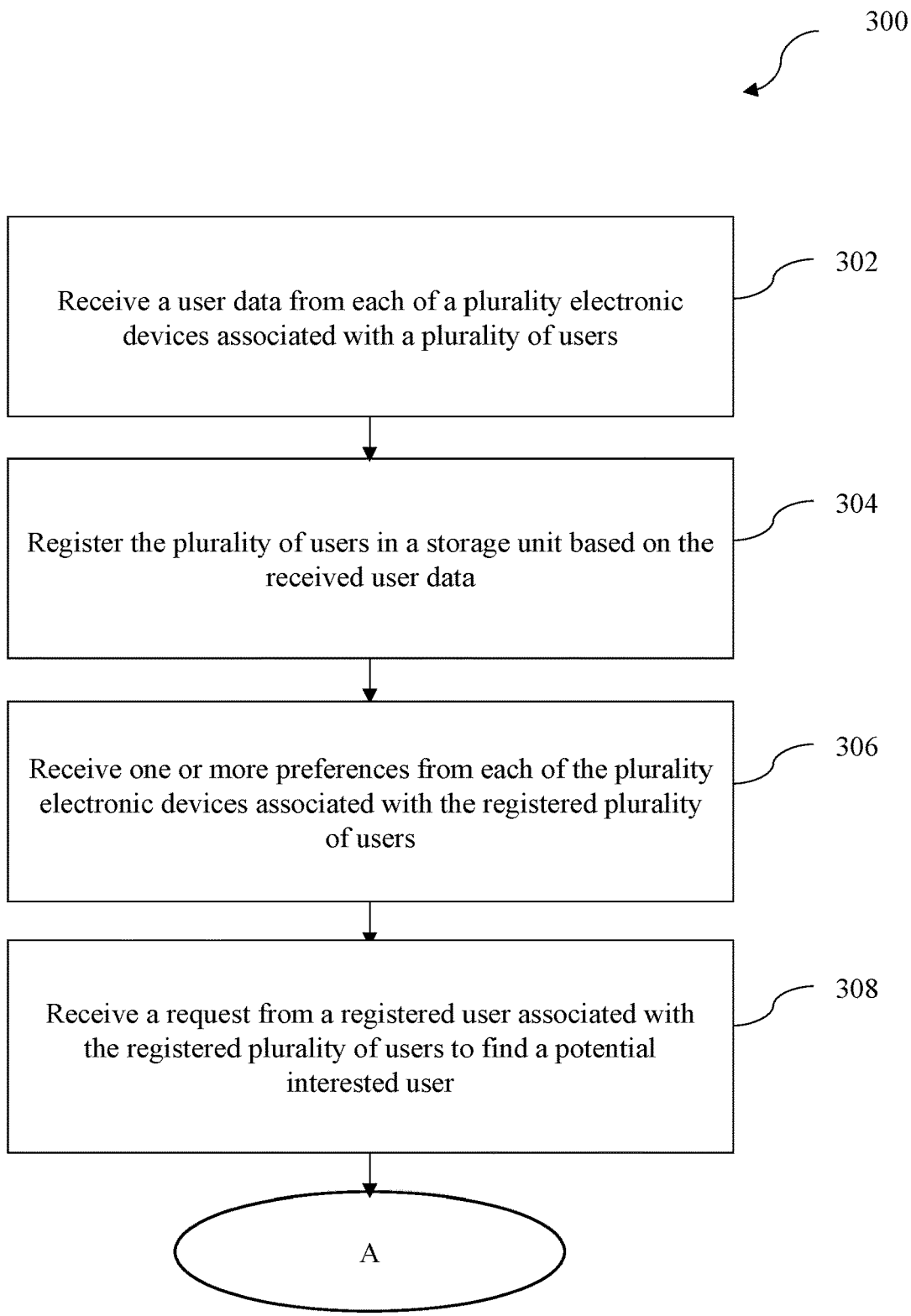
FIG. 3 (contd)

SYSTEM AND METHOD FOR FACILITATING SOCIAL NETWORKING AMONG USERS

EARLIEST PRIORITY DATE

This Application claims priority from a Provisional patent application filed in the United States of America having Patent Application No. 63/190,715, filed on May 19, 2021, and titled "SYSTEM NETWORKING SYSTEM, APPARATUS AND METHOD".

FIELD OF INVENTION

Embodiments of the present disclosure relate to social networking services and more particularly relate to a system and method for facilitating social networking among users.

BACKGROUND

Online social networking has become very popular over the past several years, including online dating services and online professional networking services. Typically, users of these services create an online profile, and a computer system matches people based on their profiles. Alternatively, users may manually peruse other users' profiles to identify potential dating or professional partners. Once a match has been determined, either by the computer system or by manual identification, users may contact each other, typically through the applicable social networking platform until they decide to meet in person.

Generally, conventional online social networking services are convenient to use. However, the conventional online social networking services requires a user to spend a considerable amount of time in either waiting for the computer system to identify suitable matches, or to manually scroll through numerous user profiles. Further, when a match is determined online, users are frequently disappointed when they meet in person, as people often misrepresent themselves by flattering photos or describing themselves as successful, talented, humorous, or otherwise interesting. The conventional online social networking services do not provide a convenient way for users to first meet in person and then use the online social networking service to continue a conversation without giving out personal information, such as phone number, email address, etc. Furthermore, the conventional online social networking services cannot control who receives personal information posted in their user profiles. The conventional online social networking services do not make it easier for people to meet for the first time, in person.

Hence, there is a need for an improved system and method for facilitating social networking among users, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system facilitating social networking among users is disclosed. The computing system includes one or more hardware processors and a memory coupled to the one or more hardware processors. The memory includes a plurality of modules in the form of programmable instructions executable by the one or more hardware processors. The plurality of modules include a user data receiver module configured to receive a user data from each of a plurality electronic devices associated with a plurality of users. The plurality of modules also include a data registration module configured to register the plurality of users in a storage server based on the received user data. The plurality of modules includes a preference receiver module configured to receive one or more preferences from each of the plurality electronic devices associated with the registered plurality of users. Further, the plurality of modules include a request receiver module configured to receive a request from a registered user associated with the registered plurality of users to find a potential interested user. The received request includes at least one of: one or more images and one or more videos of people in-proximity of the registered user. The at least one of: one or more images and one or more videos are captured using a camera of an electronic device associated with the registered user. The plurality of modules also include a data identification module configured to identify one or more potential interested users at real-time based on a location of the user, the received user data, the received one or more preferences and the received request. The one or more potential interested users corresponds to the registered plurality of users. The location of the registered user and locations of the identified one or more potential interested users are same. The one or more potential interested users correspond to one of: a date, a professional and a friend. Furthermore, the plurality of modules include an icon generation module configured to generate one or more Augmented Reality (AR) icons at real-time for the identified one or more potential interested users based on the received user data, the received one or more preferences, a predefined icon information and the received request by using an AR technique. The one or more icons include relationship status, age, gender and height. The plurality of modules include a data mapping module configured to superimpose the generated one or more AR icons on the at least one of: one or more images and one or more videos at real-time by using the AR technique. The plurality of modules include a data output module configured to output the at least one of: one or more images and one or more videos at real-time on user interface screen of the electronic device associated with the registered user upon superimposing the generated one or more AR icons.

In accordance with another embodiment of the present disclosure, a method for facilitating social networking among users is disclosed. The method includes receiving a user data from each of a plurality electronic devices associated with a plurality of users. The method also includes registering the plurality of users in a storage server based on the received user data. The method further includes receiving one or more preferences from each of the plurality electronic devices associated with the registered plurality of users. Further, the method includes receiving a request from a registered user associated with the registered plurality of users to find a potential interested user. The received request includes at least one of: one or more images and one or more videos of people in-proximity of the registered user. The at least one of: one or more images and one or more videos are captured using a camera of an electronic device associated with the registered user. Also, the method includes identifying one or more potential interested users at real-time based on a location of the user, the received user data, the received one or more preferences and the received request.

The one or more potential interested users corresponds to the registered plurality of users. The location of the registered user and locations of the identified one or more potential interested users are same. The one or more potential interested users correspond to one of: a date, a professional and a friend. Further, the method includes generating one or more Augmented Reality (AR) icons at real-time for the identified one or more potential interested users based on the received user data, the received one or more preferences, a predefined icon information and the received request by using an AR technique. The one or more icons include relationship status, age, gender and height. The method includes superimposing the generated one or more AR icons on the at least one of: one or more images and one or more videos at real-time by using the AR technique. The method includes outputting the at least one of: one or more images and one or more videos at real-time on user interface screen of the electronic device associated with the registered user upon superimposing the generated one or more AR icons.

Embodiment of the present disclosure also provide a non-transitory computer-readable storage medium having instructions stored therein that, when executed by a hardware processor, cause the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
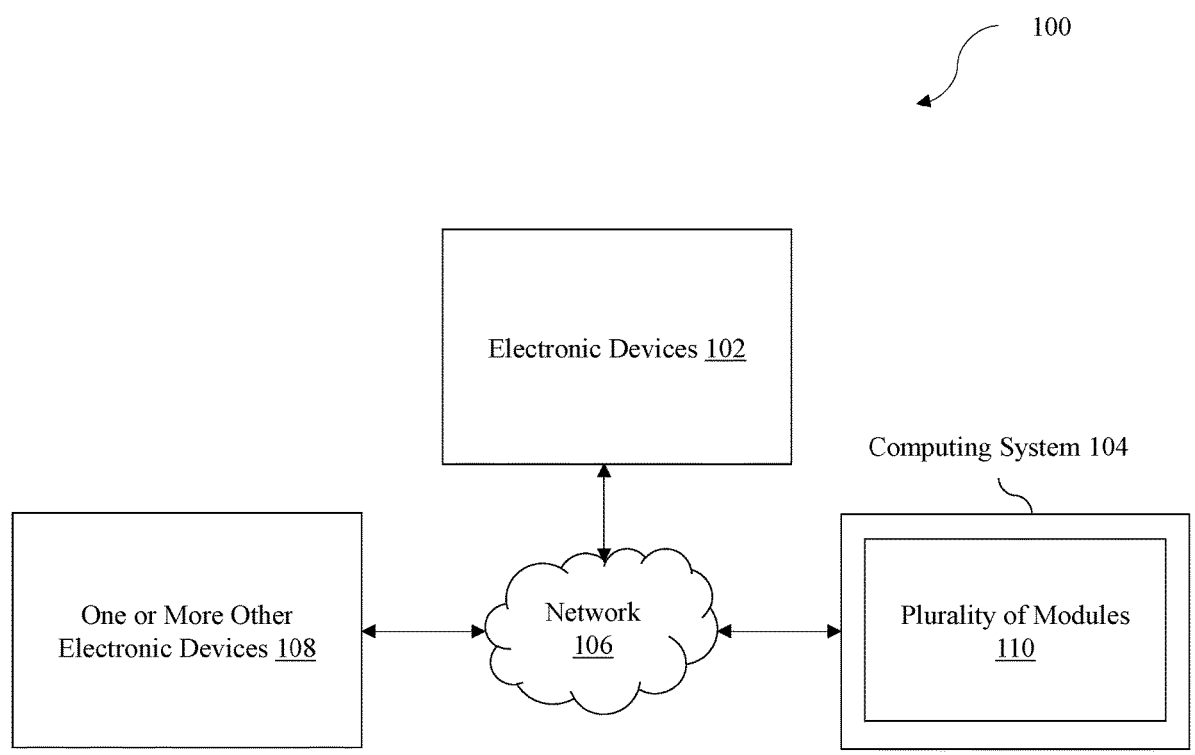
FIG. 1 is a block diagram illustrating an exemplary computing environment for facilitating social networking among users, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIGS. 1 through FIG. 4C, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for facilitating social networking among users, in accordance with an embodiment of the present disclosure. According to FIG. 1, the computing environment 100 includes an electronic device 102 associated with a registered user communicatively coupled to a computing system 104 via a network 106. In an embodiment of the present disclosure, the registered user may be a user looking for a date, a professional, a friend and the like. The computing system 104 may correspond to an online dating service, an online professional networking service or any other service that allows people to meet and communicate with each other, both in an online setting and in person. The electronic device 102 is used by the registered user to capture one or more images, one or more videos of people in-proximity of the registered user or a combination thereof by using a camera of the electronic device 102. The electronic device 102 is also used by the registered user to receive the one or more images, the one or more videos at real-time or a combination thereof upon superimposing the generated one or more AR icons. In an exemplary embodiment of the present disclosure, the electronic device 102 may include a laptop computer, desktop computer, tablet computer, smartphone, wearable device, smart watch, and the like. In an embodiment of the present disclosure, the computing system 104 may be hosted on a central server, such as cloud server or a remote server. Further, the network 106 may be internet or any other wireless network.

Further, the computing environment 100 includes one or more other electronic devices 108 associated with one or more potential interested users communicatively coupled to the computing system 104 via the network 106. In an embodiment of the present disclosure, the one or more other electronic devices 108 are used by the one or more potential interested users for communicating with the electronic device 102. In an embodiment of the present disclosure, the one or more potential interested users may correspond to a date, a professional or a friend. In an exemplary embodiment of the present disclosure, the one or more other electronic devices 108 may include a laptop computer, desktop computer, tablet computer, smartphone, wearable device, smart watch, and the like.

Furthermore, the one or more other electronic devices 108 and the electronic device 102 include a local browser, a mobile application. or a combination thereof. The registered user and the one or more potential interested users may use a web application via the local browser, the mobile application, or a combination thereof to communicate with the computing system 104. In an embodiment of the present disclosure, the computing system 104 includes a plurality of modules 110. Details on the plurality of modules 110 have been elaborated in subsequent paragraphs of the present description with reference to FIG. 2.

In an embodiment of the present disclosure, the computing system 104 is configured to receive a user data from each of the plurality electronic devices associated with a plurality of users. Further, the computing system 104 registers the plurality of users in a storage unit based on the received user data. The computing system 104 receives one or more preferences from each of the plurality electronic devices associated with the registered plurality of users. The computing system 104 receive a request from a registered user associated with the registered plurality of users to find a potential interested user. The received request includes one or more images, one or more videos of people in-proximity of the registered user or a combination thereof. The computing system 104 identifies the one or more potential interested users at real-time based on a location of the user, the received user data, the received one or more preferences and the received request. Furthermore, the computing system 104 generates one or more Augmented Reality (AR) icons at real-time for the identified one or more potential interested users based on the received user data, the received one or more preferences, a predefined icon information and the received request by using an AR technique. The computing system 104 superimposes the generated one or more AR icons on the one or more images, the one or more videos or a combination thereof at real-time by using the AR technique. The computing system 104 outputs the one or more images, the one or more videos or a combination thereof at real-time on user interface screen of the electronic device 102 associated with the registered user upon superimposing the generated one or more AR icons.

Figure 2:
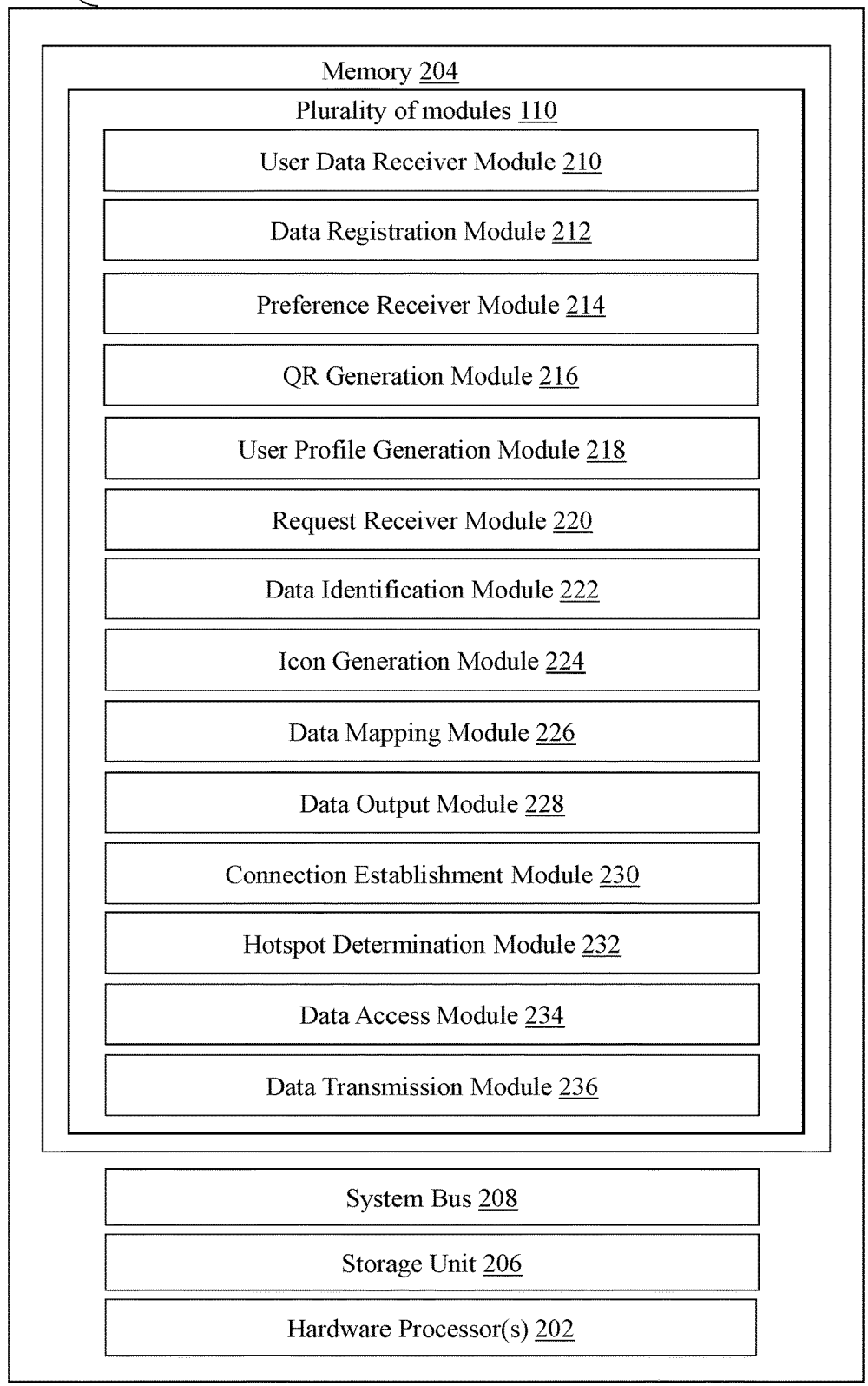
FIG. 2 is a block diagram illustrating the exemplary computing system for facilitating social networking among users, in accordance with an embodiment of the present disclosure.

FIG. 2 is a block diagram illustrating an exemplary computing system 104 facilitating social networking among users, in accordance with an embodiment of the present disclosure. In an embodiment of the present disclosure, the computing system 104 corresponds to the online dating service, the online professional networking service, or any other service that allows people to meet and communicate with each other, both in an online setting and in person. Further, the computing system 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 110 in the form of programmable instructions executable by the one or more hardware processors 202. Further, the plurality of modules 110 includes a user data receiver module 210, a data registration module 212, a preference receiver module 214, a QR generation module 216, a user profile generation module 218, a request receiver module 220, a data identification module 222, an icon generation module 224, a data mapping module 226, a data output module 228, a connection establishment module 230, a hotspot determination module 232, a data access module 234 and a data transmission module 236.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 110 stored in the form of machine-readable instructions on any of the above-mentioned storage media and may be in communication with and executed by the one or more hardware processors 202.

The storage unit 206 may be a cloud storage. The storage unit may store the user data, the one or more preferences, the one or more images, the one or more videos, location of the registered users, locations of the one or more potential interested users, the one or more AR icons, a Quick Response (QR) code, the determined one or more hotspots and the like.

The user data receiver module 210 is configured to receive the user data from each of the plurality electronic devices associated with the plurality of users. Before receiving the user data, the plurality of users are required to download the application. Further, the plurality of users may enter the application via phone number, Facebook, Apple, or Google sign in. When entering via a phone number a two-way authentication code may come via text for entry. This shows automatically for pre-fill when verifying phone number. In an exemplary embodiment of the present disclosure, the plurality of electronic devices may include a laptop computer, desktop computer, tablet computer, smartphone, wearable device, smart watch, and the like. In an embodiment of the present disclosure, the plurality of users are users looking for a date, a professional, a friend and the like. Further, the user data includes first name, one or more photos, one or more videos, birthdate, vocation, education, physical address, hobbies, age, method of identification, one or more items used in business or hobbies, personal interests, work interests, one or more narratives, email address of the plurality of users and the like. In an exemplary embodiment of the present disclosure, the one or more narratives may include persona, relationship the user desires and the like.

The data registration module 212 is configured to register the plurality of users in the storage unit based on the received user data. In an embodiment of the present disclosure, upon registering the plurality of users, a full profile including the user data is created for each of the plurality of users.

The preference receiver module 214 is configured to receive the one or more preferences from each of the plurality electronic devices associated with the registered plurality of users. In an exemplary embodiment of the present disclosure, the one or more preferences include gender, age, height, distance, eye color, weight, race, religion, hair color, vocation types, personality types, location, zodiac sign, smoker or non-smoker, drinker or non-drinker, children, education level and other physical, professional, or physical traits. For example, the vocational types include professional, advanced degree, specific vocations i.e., doctor, layer, and the like. The personality type may be outgoing, quiet and the like. In an embodiment of the present disclosure, the one or more preferences are used as a filter to exclude people that do not meet user's desired physical, or personality traits described in the one or more preferences. The one or more preferences are used to detect people who fit the user's criteria and the detected people are outputted to the user.

The QR generation module 216 is configured to generate a QR code for each of the plurality of users based on the received user data. In an embodiment of the present disclosure, the QR code is scanned by other users to obtain the user data. The QR code is shared with the other users via one or more means. In an exemplary embodiment of the present disclosure, the one or more means include QR cards, allowing the other users to scan the QR code, email, share on social media, apparel or shirts for large events, music festivals and the like, car decals, stickers, such as game of 'tag', patches, hats, dog shirts, fake tattoos, backpacks, tote bags, hats/ballcaps, animal apparel, and the like. In an embodiment of the present disclosure, QR cards are 2×2 inch business style cards. For example, When the QR code is shared by a user A and scanned by a user B, the user B can then view user A's profile. The user B can choose from there if they would like to connect or not and are given the option to download the application regardless of which they choose. Once the two users connect in the application, the user B can fully view profiles of all users, as well as that of user A. They can then communicate in the application to coordinate further if they want to plan a date. In an example, the user may order a shirt that has their QR code (which connects to their dating/networking profile) printed on the back. This shirt can be used at the Gym or a Music Festival (for example). Fifty people may scan the code and want to connect, but the user holds the power in approving connections. It is simply a way of advertising that "I'm single, let's see if it's a match, scan my code". This brings the real back to online dating. Without rejection, with distance and respect, and in a "tradition meets technology" approach.

In an embodiment of the present disclosure, the plurality of users has the option to share their own profile with friends or family to allow their friends or family to share with others in hopes of playing matchmaker for the application user via text, social media, or email. Additionally, it can be shared via social media, allowing to maximize the reach for potential matches. The plurality of users has the option to not be filtered based on age avoiding age discrimination allowing for potentially more matches based on compatibility. Further, the plurality of users may filter their "favourites" into a new chat location for easy and faster viewing. The plurality of users are also allowed to play metaverse game within the application. This is beneficial in that regular chat or discussion can be hard to initiate and maintain. Furthermore, the plurality of users allows for individuals who are not looking to date, such as married, committed, and the like, but would rather network, to hold profiles that represent their unit as a family/couple/or self. Their profile would be filtered separately from the singles and allows them access to QR to profile capabilities. This is great for parents, professionals, hobbyist, and more. It includes the non-dating scene and maximizes the reach of users to the application. This will allow a special corner within the application that is dedicated to the LGBTQ community. The computing system 104 also allows LGBTQ community to network or date amongst each other using QR code to profile technology. Additionally, their feature may allow for a "resource and support community" style approach. Thus, options to date, as well as serve as mentors to others.

The user profile generation module 218 is configured to generate a web page for each of the registered plurality of users by using one or more predefined fields from the user data. In an exemplary embodiment of the present disclosure, the one or more predefined fields include name, age of the plurality of users, Uniform Resource Locator (URL) of application, a QR code, a bar code or an URL to access the user data, one or more photographs of the plurality of users and the like. In an embodiment of the present disclosure, a scannable code, such as the QR code and the bar code, is shared with other people, whether they are users or not of the computing system 104 and receive additional information of a user. The scannable code allows other users and non-users to scan the scannable code and wither directed to the web page including user profile having the one or more fields of the user they met in person. When scanner does not have an application associated with the computing system 104 in their device, the scanner is directed to the application to download it. When the scanner has the application associated with the computing system 104 in their device, the scanner is directed to the user data i.e., full user profile related to the user they just met.

For example, when the full profile of a user is created, the user profile generation module automatically generates the webpage including condensed user profile based on the one or more predefined fields of the user data and stores the webpage in associated with the URL unique to the user. The condensed user profile includes a portion of the user profile, such that the other person who is not a user of the computing system 104 may view some of the user's profile in order to determine whether or not to further an initial contact with the user. The condensed user profile does not contain any personally identifiable contact information, such as the user's phone number, email address, physical address or place of employment. In an example, the condensed user profile includes name and primary photograph of the user. In another example, the condensed user profile includes name, age and primary photograph of the user. Further, the condensed user profile also includes the URL indicative of a website where a person may download the application, such as URL to Google Play or Apple Store. The URL may be shown as embedded into a hyperlink, such as 'Yes, I'd love to connect'. Furthermore, the scannable code such as the bar code or the QR code may be generated including the URL where the condensed user profile may be found. The scannable code may additionally include a URL that identifies the user via deep linking when another user of the computing system 104 scans the scannable code. In an embodiment of the present disclosure, the scannable code may be stored in memory associated with the first user and is accessed by the user via the first application. The user may print the scannable code onto the card, for example in the form of a business card, along with one or more other predetermined first user profile information, either chosen by the user or automatically chosen by the computing system 104, such as one or more other photographs, hobbies and the like. For example, the card may include a photograph of the user and a scannable code identifying a web page where the user's condensed user profile may be found. In another example, the card may include the user's name and the scannable code.

In an embodiment of the present disclosure, the user may go out in public with one or more card that he or she has created. If the user meets someone that the user finds interesting or attractive, the user may hand that person one of the user's card with the scannable code on it. Alternatively, the user may open the application and display the scannable code to allow the other person to scan it with an electronic device 102 associated with the other person. In another embodiment of the present disclosure, the user may share the scannable code with the other person via a local sharing application, such as Airdrop. At some later time, when the other person desires to communicate with the user, the other person may use his or her electronic device 102 to visit the user's condensed user profile web page by scanning the scannable code on the card that was received by the other person during initial in-person meeting with the first person or by typing the URL on the card. The electronic device 102 of the other person retrieves the first user's condensed user profile from the storage unit and display the condensed user profile on the electronic device 102. The other person may then decide that he or she are interested to contact the user for future online correspondence or in-person meetings.

When the other person is not a user of the computing system 104, the other person may click on the URL provided on the condensed user profile and be directed to the online repository to download the application. Further, the other personal download the application and enters the user data to get registered. Furthermore, the user's profile may be added to other person's account as a candidate even if the user does not possess all the qualities desired by the other person. In another embodiment of the present disclosure, when the other person is already the user of the computing system 104, the other person may scan the scannable code from the user and the user's profile is added to other person's account and displayed on the electronic device 102. In this scenario, the one or more preferences of the other person is not considered. Further, the computing system 104 differentiates between people who met initially online through the application and people who have met initially in-person by presenting them differently in the application. After viewing the full profile of the first user, the other person may choose to mike the user, which causes the electronic devices associated with the other person to send a message to the computing system 104, where the like is directed to the first user on the electronic device 102 associated with the user for display. If the user decided to like the other person in return, the electronic device 102 associated with the user sends a message to the computing system 104, and the computing system 104 forwards the like to the electronic device 102 associated with the other person. When the user and the other person likes each other, they may be allowed to communicate with other via the application. For example, a chat function may become available that allows the first user and the other person to send each other text messages or communicate verbally via an IP-based telephone service incorporated into the application. Further, the scannable codes are useful for easily referring potential dates, business partners or friends to others. For example, if a first user of the computing system 104 meets a second user of the computing system 104, wither online or in-person, the first user may send a QR code belonging to the second user to another person, either a third user of the computing system 104 or someone who is not yet a user. In an embodiment of the present disclosure, the scannable codes are easily shared using electronic communication tools, such as text messaging, email and Air drop. In the case that the QR code is sent to a third user, the third user may simply scan the QR code and have the second user added as a potential candidate to the third user's account. In the case that the QR code is sent to someone who is not yet a member of the computing system 104, that person may also scan the code and be directed to a condensed version of the second user's full profile, then decide whether to further initiate communication with the second user by downloading the application and becoming a member.

The request receiver module 220 is configured to receive the request from the registered user associated with the registered plurality of users to find the potential interested user. In an embodiment of the present disclosure, the received request includes one or more images, one or more videos of people in-proximity of the registered user or a combination thereof. In an embodiment of the present disclosure, the one or more images, the one or more videos or a combination thereof are captured using the camera of the electronic device 102 associated with the registered user.

The data identification module 222 is configured to identify the one or more potential interested users at real-time based on the location of the user, the received user data, the received one or more preferences and the received request.

In an embodiment of the present disclosure, the one or more other electronic devices 108 are used by the one or more potential interested users for the purpose of communicating with the computing system 104. In an embodiment of the present disclosure, the one or more potential interested users corresponds to the registered plurality of users. The location of the registered user and the locations of the identified one or more potential interested users are same. In an embodiment of the present disclosure, the one or more potential interested users correspond to a date, a professional or a friend. In identifying the one or more potential interested users at real-time based on the location of the user, the received user data, the received one or more preferences and the received request, the data identification module 222 identifies one or more users present in proximity of the registered users based on the location of the user and locations of the one or more users. The one or more users correspond to the registered plurality of users. Further, the data identification module 222 identifies the one or more potential interested users at real-time from the identified one or more users based on the received user data, the received one or more preferences and the received request. Furthermore, the data identification module 222 detects the identified one or more potential interested users in the one or more images, one or more videos or a combination thereof by using a face recognition technique.

The icon generation module 224 is configured to generate the one or more AR icons at real-time for the identified one or more potential interested users based on the received user data, the received one or more preferences, a predefined icon information and the received request by using an AR technique. In an embodiment of the present disclosure, the AR technique is Lightship Augmented Reality Developer Kit (ARDK). The one or more icons include relationship status, age, gender, height, and the like. In an embodiment of the present disclosure, the generated one or more AR icons are superimposed on the one or more images, the one or more videos or a combination thereof including the detected one or more potential interested users by using the AR technique. For example, the AR technique brings together the tools and technology required to produce AR titles, real-time Mapping, understanding, and sharing. Visually, singles will be able to hold up their phone and see who in the room is on the application. They would point their camera towards another single and if they are on the App and in "SEE ME" mode, an icon would show over the person's phone identifying them as single and open to being approached by other singles.

The data mapping module 226 is configured to superimpose the generated one or more AR icons on the one or more images, the one or more videos or a combination thereof at real-time by using the AR technique.

The data output module 228 is configured to output the one or more images, one or more videos or a combination thereof at real-time on user interface screen of the electronic device 102 associated with the registered user upon superimposing the generated one or more AR icons.

The connection establishment module 230 is configured to receive one or more QR codes from one or more other users via one or more means. In an embodiment of the present disclosure, the one or more other users correspond to the registered plurality of users. Further, the connection establishment module 230 scans the received one or more QR codes to obtain the user data associated with the one or more other users. The connection establishment module 230 transmits a request to each of the one or more other users for adding the one or more others in user connection list upon obtaining the user data. Furthermore, the connection establishment module 230 receives one or more responses to the transmitted request. The one or more responses acceptance of the transmitted request or refusal of the transmitted request. The connection establishment module 230 creates a one-on-one communication page to allow communication between the registered user and the one or more other users.

The hotspot determination module 232 receives a request to find one or more hotspots in proximity of the registered user. The request includes a desired distance range of hotspots, a desired gender, and a timer. The one or more hotspots are venues where maximum potential interested users are present. Further, the hotspot determination module 232 determines the one or more hotspots based on the received request, the location of the registered user and the predefined hotspot information. In an embodiment of the present disclosure, the predefined hotspot information includes a list of the venues and their locations. For example, this feature has two primary needs. The user and the venue to be registered as a "Hot Spot", venues will register to be part of the "Hot Spots" list. They will advertise their location as a "Hot Spot" the application. As users come and go to a registered "Hot Spot", the count for the location will change and rank them on the list as to which "Hot Spot" has the most App users at that time. This allows singles to know where the most singles are and allows businesses to compete and to offer discounts/deals to drive in more business. In an embodiment of the present disclosure, the registered user may view number of men, women or non-binary in numbers. For example, once the user clicks the flame icon to find the one or more hotspots, a visual will appear that shows where the most singles are within the parameters set. The user may sort via distance, gender she is seeking, and so forth. In order for members to be seen on the hotspots map, they will first have to turn on the timer. This timer can be set for 1, 2, or 3-hour timeframes. The purpose of the timer is for safety in the event that a person gets drunk and forgets that their timer is on. When the timer has been turned on, it allows them to be Global Position System (GPS) located for other singles to find them at hotspots to facilitate real life connections while also out being social. The timer is in the account settings area. The venues may also be listed in order of who has the most singles in their venue. Additionally in this area, venues may have the opportunity to offer discounts/specials/coupons to drive in business as well.

The data access module 234 receives a request from the registered user to view the one or more potential interested users in proximity of the registered user. The request includes location of the registered user. Further, the data access module 234 detects the one or more potential interested users based on the received user data, the received one or more preferences, the received request and one or more locations of the one or more potential interested users. The data access module 234 obtains the user data of the detected one or more potential interested users. Furthermore, the data access module 234 performs one or more operations corresponding to the detected one or more potential interested users upon obtaining the user data. In an exemplary embodiment of the present disclosure, the one or more operations include transmit the user data to the one or more potential interested users, transmit a request to each of the one or more potential interested users for adding the one or more others in user connection list, transmit the QR code in person with the one or more potential interested users and the like. For example, the user wants to know "who in the room with me is single?". The user may select a "location" icon to find who in her direct location area is single. The GPS may locate the address to which the user is at and show other users within the same address. The list of these singles may appear in a "room radar" page (that appears after you click on the location icon). The user may then open profiles to see if these users would be a good match for her. When she opens the profile of another single (for example Nick), an overlay will appear giving her the option to share her profile with Nick, send a like via profile, or to go share her QR code in person with Nick. Both users are required to like each other for the connection to be successful. The match would then show in a "connections" page.

The data transmission module 236 is configured to receive a request from the registered user to view the one or more potential interested users. In an embodiment of the present disclosure, the request includes location of the registered user, a timer, a relationship status of the registered user and the like. The relationship status of the registered user is single. Further, the data transmission module 236 detects the one or more potential interested users based on the received user data, the received one or more preferences and the received request. The detected one or more potential interested users and distance of each of the detected one or more potential interested users from the registered user is outputted to the electronic device 102. The data transmission module 236 selects a potential interested user from the detected one or more potential interested users based on one or more inputs of the registered user. Furthermore, the data transmission module 236 broadcasts the user data to the selected potential interested user. The data transmission module 236 receives a request from the selected potential interested user to meet-up in real. The data transmission module 236 also accepts the received request of the selected potential interested user. Further, the data transmission module 236 transmits the location of the registered user and one or more disclaimers to the selected potential interested user upon accepting the received request. For example, the user desires to have drinks but is going out alone. The user wants to invite others to make a move with her. The user is required to change settings for inviting others. This gives her the options of 1, 2, or 3 hours which can be selected for her estimated time to be on radar of other singles while being out. The timer is a safety feature to prevent forgetting and remaining trackable throughout an evening out. With this feature also, every hour will be a reminder to ask if they still want to be tracked with the timer. If another user (Nick) were to see her profile in the application and the user is currently in inviting mode, there would be a small timer in the top right corner showing she's currently in inviting mode. Helping facilitate real meetups in a spontaneous approach. Nick could simply click the timer and an overlay would appear giving two options i.e., request to make move and request to join the user. Further, the user would receive a text message stating "Nick has requested to shoot his shot. Let them know if it's ok". The user would click on the message, which would direct her to his profile and an overlay with options that 'Come say hi!' (Accepting his request) or 'Sorry not tonight, thank you!' (Kindly denying the request). If the user accepts the request with a "Come say Hi", Nick may receive a text message stating the address of the venue she was at (google map). All messages would come with a disclaimer that "an invitation to come say hello is not an invitation to stay. Play it cool and good luck shooting your shot!" A second way of finding singles who are out on the prowl looking to "shoot their shot", is to click the timer icon on the discover bar, located when searching for singles. This icon will show users a list of profiles for users who are out and want to be approached, as well as how far they are from you. In an embodiment of the present disclosure, preferences of distance may be filtered. In another example, the registered user may indicate their location and preferred meeting arrangement type, such as dating, professional, friendship and the like. Further, the computing system 104 identifies users that are in same location of the registered user and who are looking for same meeting arrangement type. This may empower people to approach others for an introduction, knowing that they have purposefully made themselves available for meeting other people.

Figure 3:
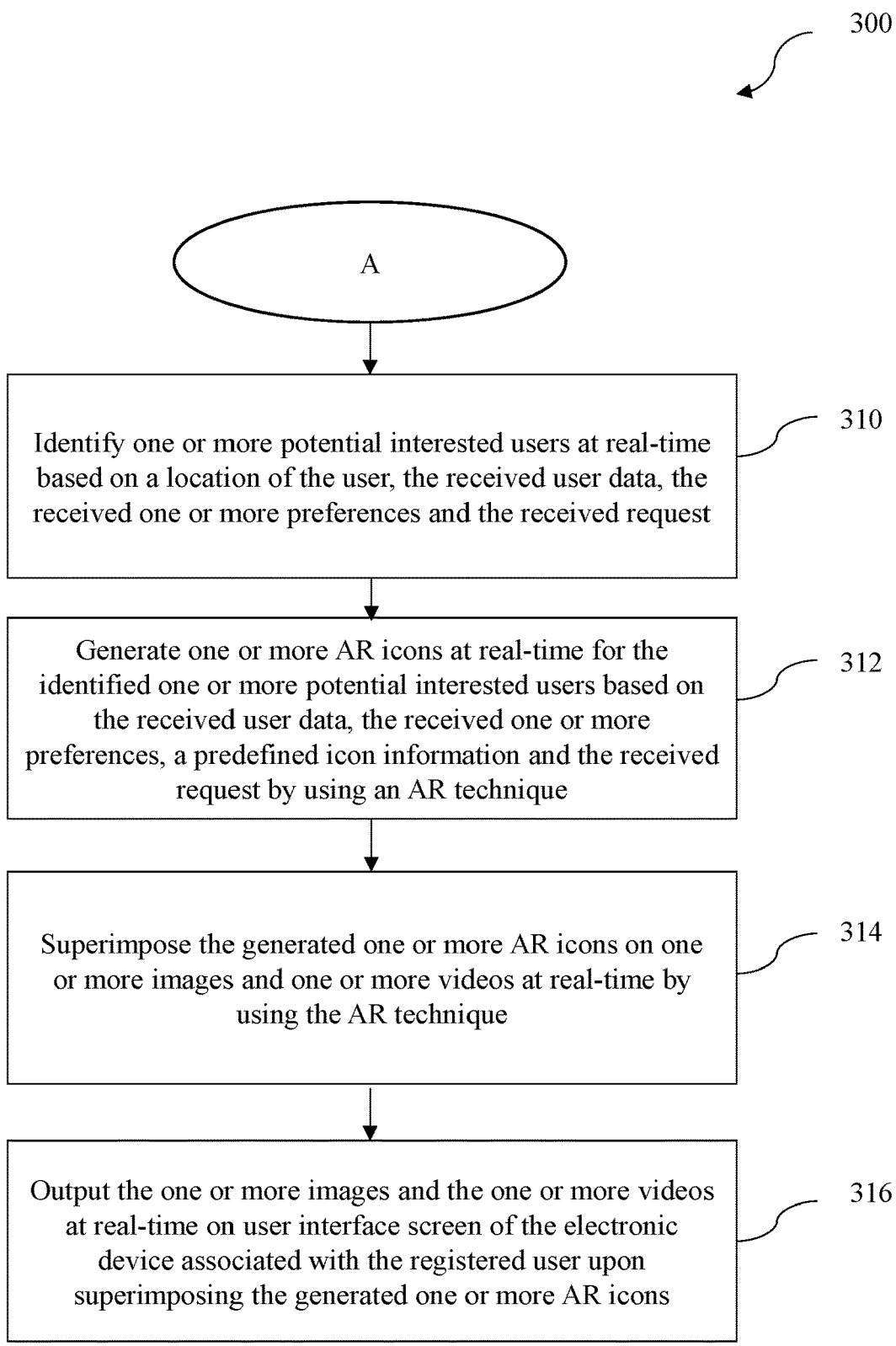
FIG. 3 is a process flow diagram illustrating an exemplary method for facilitating social networking among users, in accordance with an embodiment of the present disclosure.

FIG. 3 is a process flow diagram illustrating an exemplary method 300 for facilitating social networking among users, in accordance with an embodiment of the present disclosure. In an embodiment of the present disclosure, the method 300 corresponds to an online dating service, an online professional networking service, or any other service that allows people to meet and communicate with each other, both in an online setting and in person. At step 302, a user data is received from each of a plurality electronic devices associated with a plurality of users. Before receiving the user data, the plurality of users are required to download the application. Further, the plurality of users may enter the application via phone number, Facebook, Apple, or Google sign in. When entering via a phone number a two-way authentication code may come via text for entry. This shows automatically for pre-fill when verifying phone number. In an exemplary embodiment of the present disclosure, the plurality of electronic devices may include a laptop computer, desktop computer, tablet computer, smartphone, wearable device, smart watch, and the like. In an embodiment of the present disclosure, the plurality of users are users looking for a date, a professional, a friend and the like. Further, the user data includes first name, one or more photos, one or more videos, birthdate, vocation, education, physical address, hobbies, age, method of identification, one or more items used in business or hobbies, personal interests, work interests, one or more narratives, email address of the plurality of users and the like. In an exemplary embodiment of the present disclosure, the one or more narratives may include persona, relationship the user desires and the like.

At step 304, the plurality of users are registered in a storage unit based on the received user data. In an embodiment of the present disclosure, upon registering the plurality of users, a full profile including the user data is created for each of the plurality of users.

At step 306, one or more preferences are received from each of the plurality electronic devices associated with the registered plurality of users. In an exemplary embodiment of the present disclosure, the one or more preferences include gender, age, height, distance, eye color, weight, race, religion, hair color, vocation types, personality types, location, zodiac sign, smoker or non-smoker, drinker or non-drinker, children, education level and other physical, professional, or physical traits. For example, the vocational types include professional, advanced degree, specific vocations i.e., doctor, layer, and the like. The personality type may be outgoing, quiet and the like. In an embodiment of the present disclosure, the one or more preferences are used as a filter to exclude people that do not meet user's desired physical, or personality traits described in the one or more preferences. The one or more preferences are used to detect people who fit the user's criteria and the detected people are outputted to the user.

Further, the method 300 includes generating a QR code for each of the plurality of users based on the received user data. The QR code is scanned by other users to obtain the user data. The QR code is shared with the other users via one or more means. In an exemplary embodiment of the present disclosure, the one or more means include QR cards, allowing the other users to scan the QR code, email, share on social media, apparel or shirts for large events, music festivals and the like, car decals, stickers, such as game of 'tag', patches, hats, dog shirts, fake tattoos, backpacks, tote bags, hats/ballcaps, animal apparel, and the like. In an embodiment of the present disclosure, QR cards are 2×2 inch business style cards. For example, When the QR code is shared by a user A and scanned by a user B, the user B can then view user A's profile. The user B can choose from there if they would like to connect or not and are given the option to download the application regardless of which they choose. Once the two users connect in the application, the user B can fully view profiles of all users, as well as that of user A. They can then communicate in the application to coordinate further if they want to plan a date. In an example, the user may order a shirt that has their QR code (which connects to their dating/networking profile) printed on the back. This shirt can be used at the Gym or a Music Festival (for example). Fifty people may scan the code and want to connect, but the user holds the power in approving connections. It is simply a way of advertising that "I'm single, let's see if it's a match, scan my code". This brings the real back to online dating. Without rejection, with distance and respect, and in a "tradition meets technology" approach.

In an embodiment of the present disclosure, the plurality of users has the option to share their own profile with friends or family to allow their friends or family to share with others in hopes of playing matchmaker for the application user via text, social media, or email. Additionally, it can be shared via social media, allowing to maximize the reach for potential matches. The plurality of users has the option to not be filtered based on age avoiding age discrimination allowing for potentially more matches based on compatibility. Further, the plurality of users may filter their "favourites" into a new chat location for easy and faster viewing. The plurality of users are also allowed to play metaverse game within the application. This is beneficial in that regular chat or discussion can be hard to initiate and maintain. Furthermore, the plurality of users allows for individuals who are not looking to date, such as married, committed, and the like, but would rather network, to hold profiles that represent their unit as a family/couple/or self. Their profile would be filtered separately from the singles and allows them access to QR to profile capabilities. This is great for parents, professionals, hobbyist, and more. It includes the non-dating scene and maximizes the reach of users to the application. This will allow a special corner within the application that is dedicated to the LGBTQ community.

Furthermore, the method 300 includes generating a web page for each of the registered plurality of users by using one or more predefined fields from the user data. In an exemplary embodiment of the present disclosure, the one or more predefined fields include name, age of the plurality of users, Uniform Resource Locator (URL) of application, a QR code, a bar code or an URL to access the user data, one or more photographs of the plurality of users and the like. In an embodiment of the present disclosure, a scannable code, such as the QR code and the bar code, is shared with other people, whether they are users or not of the computing system 104 and receive additional information of a user. The scannable code allows other users and non-users to scan the scannable code and wither directed to the web page including user profile having the one or more fields of the user they met in person. When scanner does not have an application associated with the computing system 104 in their device, the scanner is directed to the application to download it. When the scanner has the application associated with the computing system 104 in their device, the scanner is directed to the user data i.e., full user profile related to the user they just met.

For example, when the full profile of a user is created, the method 300 includes automatically generating the webpage including condensed user profile based on the one or more predefined fields of the user data and stores the webpage in associated with the URL unique to the user. The condensed user profile includes a portion of the user profile, such that the other person who is not a user of the computing system 104 may view some of the user's profile in order to determine whether or not to further an initial contact with the user. The condensed user profile does not contain any personally identifiable contact information, such as the user's phone number, email address, physical address or place of employment. In an example, the condensed user profile includes name and primary photograph of the user. In another example, the condensed user profile includes name, age and primary photograph of the user. Further, the condensed user profile also includes the URL indicative of a website where a person may download the application, such as URL to Google Play or Apple Store. The URL may be shown as embedded into a hyperlink, such as 'Yes, I'd love to connect'. Furthermore, the scannable code such as the bar code or the QR code may be generated including the URL where the condensed user profile may be found. The scannable code may additionally include a URL that identifies the user via deep linking when another user of the computing system 104 scans the scannable code. In an embodiment of the present disclosure, the scannable code may be stored in memory associated with the first user and is accessed by the user via the first application. The user may print the scannable code onto the card, for example in the form of a business card, along with one or more other predetermined first user profile information, either chosen by the user or automatically chosen by the computing system 104, such as one or more other photographs, hobbies and the like. For example, the card may include a photograph of the user and a scannable code identifying a web page where the user's condensed user profile may be found. In another example, the card may include the user's name and the scannable code.

In an embodiment of the present disclosure, the user may go out in public with one or more card that he or she has created. If the user meets someone that the user finds interesting or attractive, the user may hand that person one of the user's card with the scannable code on it. Alternatively, the user may open the application and display the scannable code to allow the other person to scan it with an electronic device 102 associated with the other person. In another embodiment of the present disclosure, the user may share the scannable code with the other person via a local sharing application, such as Airdrop. At some later time, when the other person desires to communicate with the user, the other person may use his or her electronic device 102 to visit the user's condensed user profile web page by scanning the scannable code on the card that was received by the other person during initial in-person meeting with the first person or by typing the URL on the card. The electronic device 102 of the other person retrieves the first user's condensed user profile from the storage unit and display the condensed user profile on the electronic device 102. The other person may then decide that he or she are interested to contact the user for future online correspondence or in-person meetings. When the other person is not a user of the computing system 104, the other person may click on the URL provided on the condensed user profile and be directed to the online repository to download the application. Further, the other personal download the application and enters the user data to get registered. Furthermore, the user's profile may be added to other person's account as a candidate even if the user does not possess all the qualities desired by the other person. In another embodiment of the present disclosure, when the other person is already the user of the computing system 104, the other person may scan the scannable code from the user and the user's profile is added to other person's account and displayed on the electronic device 102. In this scenario, the one or more preferences of the other person is not considered. Further, the computing system 104 differentiates between people who met initially online through the application and people who have met initially in-person by presenting them differently in the application. After viewing the full profile of the first user, the other person may choose to mike the user, which causes the electronic devices associated with the other person to send a message to the computing system 104, where the like is directed to the first user on the electronic device 102 associated with the user for display. If the user decided to like the other person in return, the electronic device 102 associated with the user sends a message to the computing system 104, and the computing system 104 forwards the like to the electronic device 102 associated with the other person. When the user and the other person likes each other, they may be allowed to communicate with other via the application. For example, a chat function may become available that allows the first user and the other person to send each other text messages or communicate verbally via an IP-based telephone service incorporated into the application. Further, the scannable codes are useful for easily referring potential dates, business partners or friends to others. For example, if a first user of the computing system 104 meets a second user of the computing system 104, wither online or in-person, the first user may send a QR code belonging to the second user to another person, either a third user of the computing system 104 or someone who is not yet a user. In an embodiment of the present disclosure, the scannable codes are easily shared using electronic communication tools, such as text messaging, email and Air drop. In the case that the QR code is sent to a third user, the third user may simply scan the QR code and have the second user added as a potential candidate to the third user's account. In the case that the QR code is sent to someone who is not yet a member of the computing system 104, that person may also scan the code and be directed to a condensed version of the second user's full profile, then decide whether to further initiate communication with the second user by downloading the application and becoming a member.

At step 308, a request is received from a registered user associated with the registered plurality of users to find a potential interested user. In an embodiment of the present disclosure, the received request includes one or more images, one or more videos of people in-proximity of the registered user or a combination thereof. In an embodiment of the present disclosure, the one or more images, the one or more videos or a combination thereof are captured using the camera of the electronic device 102 associated with the registered user.

At step 310, one or more potential interested users are identified at real-time based on the location of the user, the received user data, the received one or more preferences and the received request. In an embodiment of the present disclosure, one or more other electronic devices 108 are used by the one or more potential interested users for the purpose of communicating with the computing system 104. In an embodiment of the present disclosure, the one or more potential interested users corresponds to the registered plurality of users. The location of the registered user and the locations of the identified one or more potential interested users are same. In an embodiment of the present disclosure, the one or more potential interested users correspond to a date, a professional or a friend. In identifying the one or more potential interested users at real-time based on the location of the user, the received user data, the received one or more preferences and the received request, the method 300 includes identifying one or more users present in proximity of the registered users based on the location of the user and locations of the one or more users. The one or more users correspond to the registered plurality of users. Further, the method 300 includes identifying the one or more potential interested users at real-time from the identified one or more users based on the received user data, the received one or more preferences and the received request. Furthermore, the method 300 includes detecting the identified one or more potential interested users in the one or more images, one or more videos or a combination thereof by using a face recognition technique.

At step 312, the one or more AR icons are generated at real-time for the identified one or more potential interested users based on the received user data, the received one or more preferences, a predefined icon information and the received request by using an AR technique. In an embodiment of the present disclosure, the AR technique is Lightship Augmented Reality Developer Kit (ARDK). The one or more icons include relationship status, age, gender, height, and the like. In an embodiment of the present disclosure, the generated one or more AR icons are superimposed on the one or more images, the one or more videos or a combination thereof including the detected one or more potential interested users by using the AR technique. For example, the AR technique brings together the tools and technology required to produce AR titles, real-time Mapping, understanding, and sharing. Visually, singles will be able to hold up their phone and see who in the room is on the application. They would point their camera towards another single and if they are on the App and in "SEE ME" mode, an icon would show over the person's phone identifying them as single and open to being approached by other singles.

At step 314 the generated one or more AR icons are superimposed on the one or more images, the one or more videos or a combination thereof at real-time by using the AR technique.

At step 316, the one or more images, one or more videos or a combination thereof are outputted at real-time on user interface screen of the electronic device 102 associated with the registered user upon superimposing the generated one or more AR icons.

The method 300 includes receiving one or more QR codes from one or more other users via one or more means. In an embodiment of the present disclosure, the one or more other users correspond to the registered plurality of users. Further, the method 300 includes scanning the received one or more QR codes to obtain the user data associated with the one or more other users. The method 300 includes transmitting a request to each of the one or more other users for adding the one or more others in user connection list upon obtaining the user data. Furthermore, the method 300 includes receiving one or more responses to the transmitted request. The one or more responses acceptance of the transmitted request or refusal of the transmitted request. The method 300 includes creating a one-on-one communication page to allow communication between the registered user and the one or more other users.

In an embodiment of the present disclosure, the method 300 includes receiving a request to find one or more hotspots in proximity of the registered user. The request includes a desired distance range of hotspots, a desired gender, and a timer. The one or more hotspots are venues where maximum potential interested users are present. Further, the method 300 includes determining the one or more hotspots based on the received request, the location of the registered user and the predefined hotspot information. In an embodiment of the present disclosure, the predefined hotspot information includes a list of the venues and their locations. For example, this feature has two primary needs. The user and the venue to be registered as a "Hot Spot", venues will register to be part of the "Hot Spots" list. They will advertise their location as a "Hot Spot" the application. As users come and go to a registered "Hot Spot", the count for the location will change and rank them on the list as to which "Hot Spot" has the most App users at that time. This allows singles to know where the most singles are and allows businesses to compete and to offer discounts/deals to drive in more business. In an embodiment of the present disclosure, the registered user may view number of men, women or non-binary in numbers. For example, once the user clicks the flame icon to find the one or more hotspots, a visual will appear that shows where the most singles are within the parameters set. The user may sort via distance, gender she is seeking, and so forth. In order for members to be seen on the hotspots map, they will first have to turn on the timer. This timer can be set for 1, 2, or 3-hour timeframes. The purpose of the timer is for safety in the event that a person gets drunk and forgets that their timer is on. When the timer has been turned on, it allows them to be Global Position System (GPS) located for other singles to find them at hotspots to facilitate real life connections while also out being social. The timer is in the account settings area. The venues may also be listed in order of who has the most singles in their venue. Additionally in this area, venues may have the opportunity to offer discounts/specials/coupons to drive in business as well.

Further, the method 300 includes receiving a request from the registered user to view the one or more potential interested users in proximity of the registered user. The request includes location of the registered user. Further, the method 300 includes detecting the one or more potential interested users based on the received user data, the received one or more preferences, the received request and one or more locations of the one or more potential interested users. The method 300 includes obtaining the user data of the detected one or more potential interested users. Furthermore, the method 300 includes performing one or more operations corresponding to the detected one or more potential interested users upon obtaining the user data. In an exemplary embodiment of the present disclosure, the one or more operations include transmit the user data to the one or more potential interested users, transmit a request to each of the one or more potential interested users for adding the one or more others in user connection list, transmit the QR code in person with the one or more potential interested users and the like. For example, the user wants to know "who in the room with me is single?". The user may select a "location" icon to find who in her direct location area is single. The GPS may locate the address to which the user is at and show other users within the same address. The list of these singles may appear in a "room radar" page (that appears after you click on the location icon). The user may then open profiles to see if these users would be a good match for her. When she opens the profile of another single (for example Nick), an overlay will appear giving her the option to share her profile with Nick, send a like via profile, or to go share her QR code in person with Nick. Both users are required to like each other for the connection to be successful. The match would then show in a "connections" page.

Furthermore, the method 300 includes receiving a request from the registered user to view the one or more potential interested users. In an embodiment of the present disclosure, the request includes location of the registered user, a timer, a relationship status of the registered user and the like. The relationship status of the registered user is single. Further, the method 300 includes detecting the one or more potential interested users based on the received user data, the received one or more preferences and the received request. The detected one or more potential interested users and distance of each of the detected one or more potential interested users from the registered user is outputted to the electronic device 102. The method 300 includes selecting a potential interested user from the detected one or more potential interested users based on one or more inputs of the registered user. Furthermore, the method 300 includes broadcasting the user data to the selected potential interested user. The method 300 includes receiving a request from the selected potential interested user to meet-up in real. The method 300 includes accepting the received request of the selected potential interested user. Further, the method 300 includes transmitting the location of the registered user and one or more disclaimers to the selected potential interested user upon accepting the received request. For example, the user desires to have drinks but is going out alone. The user wants to invite others to make a move with her. The user is required to change settings for inviting others. This gives her the options of 1, 2, or 3 hours which can be selected for her estimated time to be on radar of other singles while being out. The timer is a safety feature to prevent forgetting and remaining trackable throughout an evening out. With this feature also, every hour will be a reminder to ask if they still want to be tracked with the timer. If another user (Nick) were to see her profile in the application and the user is currently in inviting mode, there would be a small timer in the top right corner showing she's currently in inviting mode. Helping facilitate real meetups in a spontaneous approach. Nick could simply click the timer and an overlay would appear giving two options i.e., request to make move and request to join the user. Further, the user would receive a text message stating "Nick has requested to shoot his shot. Let them know if it's ok". The user would click on the message, which would direct her to his profile and an overlay with options that 'Come say hi!' (Accepting his request) or 'Sorry not tonight, thank you!' (Kindly denying the request). If the user accepts the request with a "Come say Hi", Nick may receive a text message stating the address of the venue she was at (google map). All messages would come with a disclaimer that "an invitation to come say hello is not an invitation to stay. Play it cool and good luck shooting your shot!" A second way of finding singles who are out on the prowl looking to "shoot their shot", is to click the timer icon on the discover bar, located when searching for singles. This icon will show users a list of profiles for users who are out and want to be approached, as well as how far they are from you. In an embodiment of the present disclosure, preferences of distance may be filtered.

The method 300 may be implemented in any suitable hardware, software, firmware, or combination thereof.

Figure 4A:
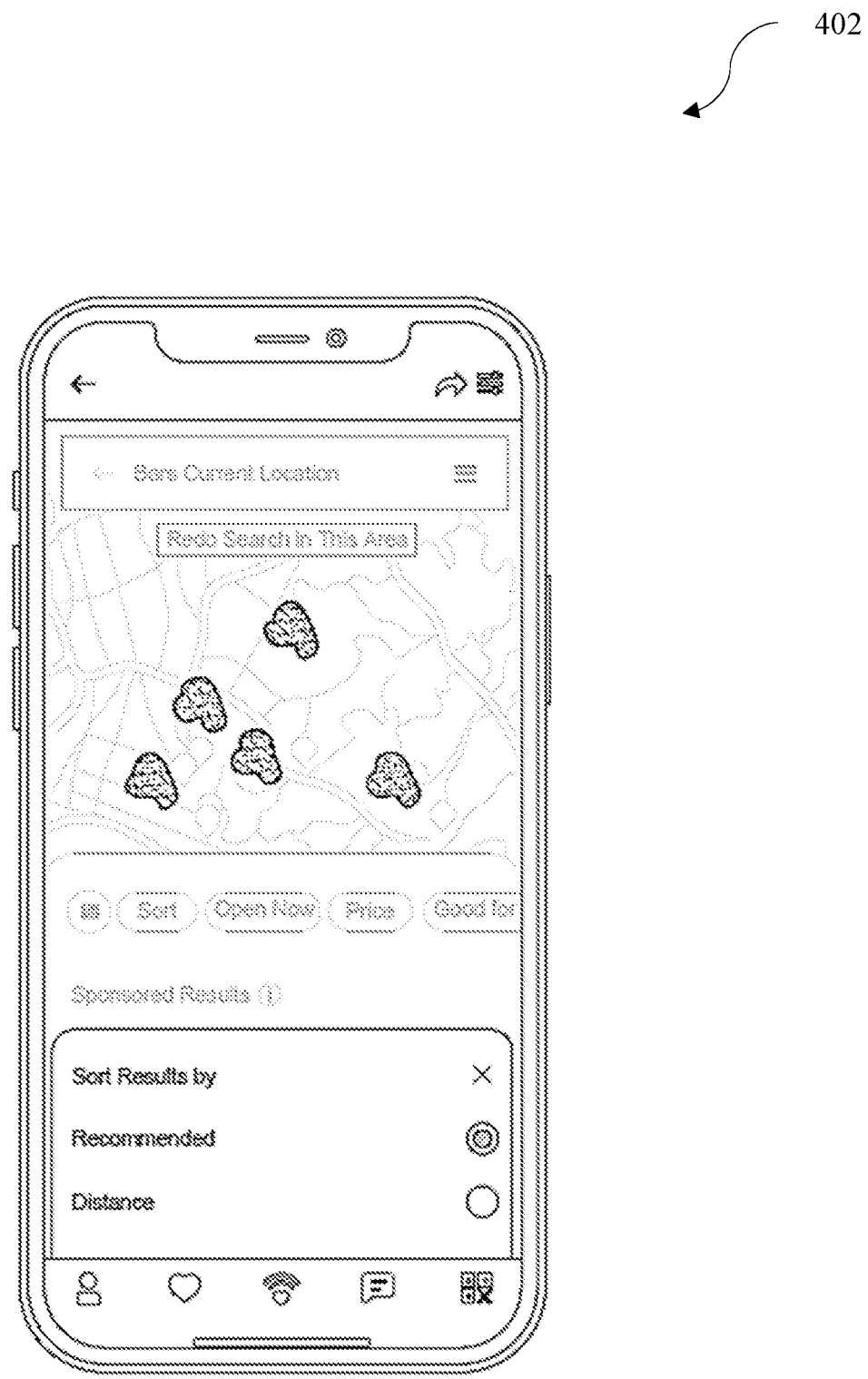
FIGS. 4A-4C are graphical user interface screens of the computing system for facilitating social networking among users, in accordance with an embodiment of the present disclosure.
Figure 4B:
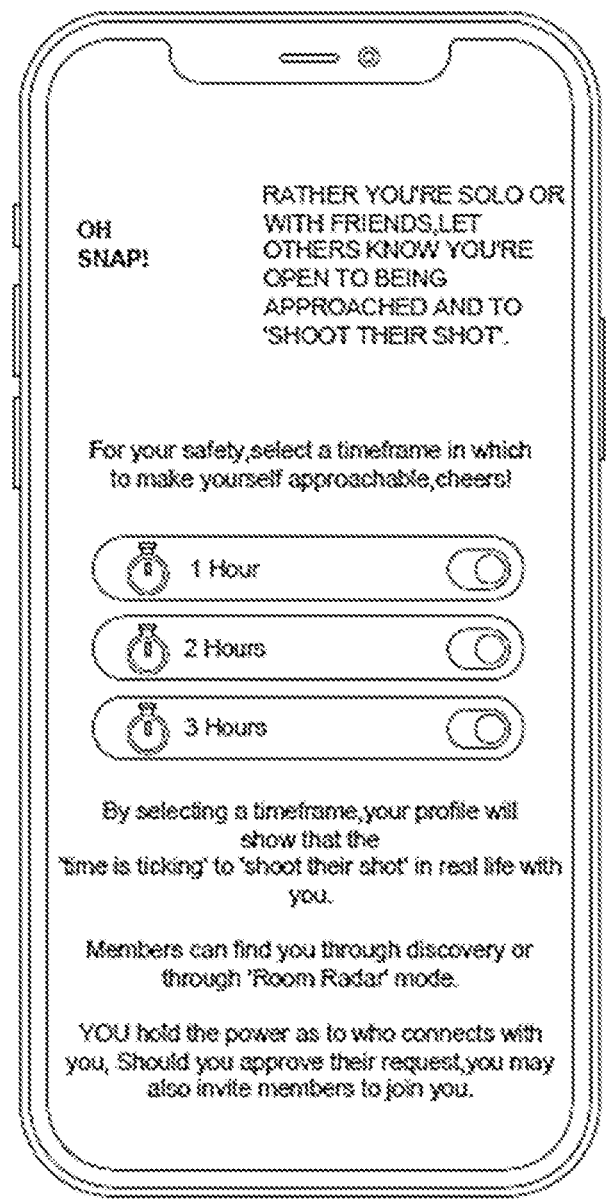
Figure 4C:
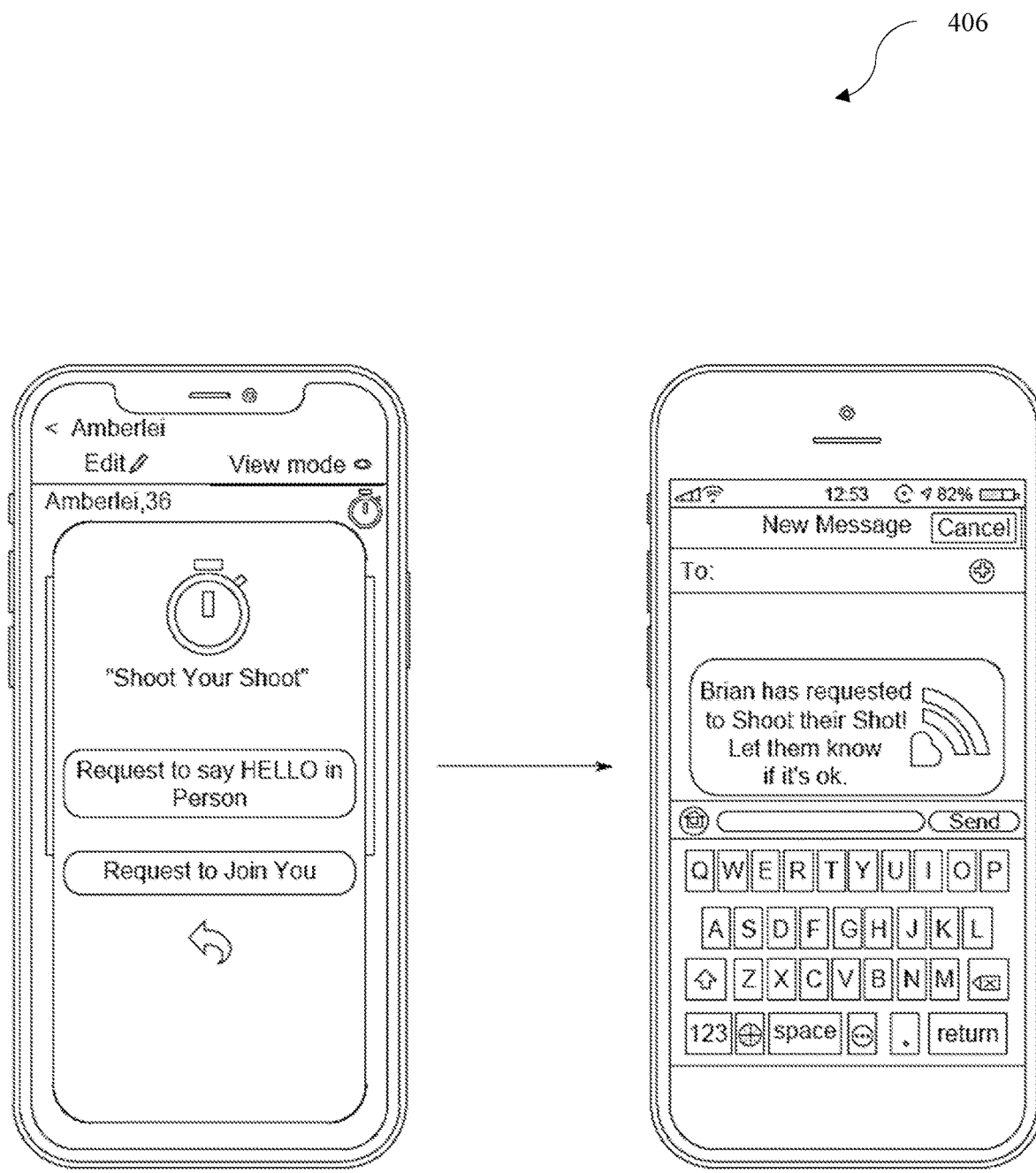

FIGS. 4A-4C are graphical user interface screens of the computing system 104 for facilitating social networking among users, in accordance with an embodiment of the present disclosure. The graphical user interface screen 402 of FIG. 4A displays a list of the one or more hotspots with flame icons. When the user clicks the flame icon, the map is displayed to the user allowing the users to set their parameters. Further, the graphical user interface screen 402 shows bars within the parameters selected, where the most singles are. The graphical user interface screen 404 of FIG. 4B shows 'oh snap' feature to let other users know that the user is single. The user can select the timer that fits her night out. Further, the graphical user interface screen 406 of FIG. 4C shows that when the user selects 'shoot your shot' feature, the user is inviting other users to make a move with her. In the graphical user interface screen 406, Brian sees Amberlei's profile and wants to 'shoot your shot'. When Brian clicks the timer, two options are displayed i.e., 'request to say hello in person' and 'request to join you'. Brian sends a request, and Amberlei receives a text.

Thus, various embodiments of the present computing system 104 provide a solution to facilitate social networking among users. The computing system 104 is designed for user safety. It removes the sharing of phone numbers through traditional dating approaches due to the cyber security concerns with sharing of Personally Identifiable Information (PII). It has timers built in for safety measures when geo-locating/tracking is involved. Thus, allowing for freedom of experience as well as room for human error. It directly bridges the gap between true human chemistry (finding someone attractive in real life) and technology (how most singles connect in today's society). It removes the ability to be catfished. It directly supports the need for dating with genuine connection without regard to online filters of religion, politics, and so on. The computing system 104 is the solution to the burdened process of online dating. Giving users freedom of choice, control of connection, and flexibility with a splash of creativity in how they connect. The computing system 104 is a hybrid-dating application which couples real and online dating methods in today's cyber world.

In an embodiment of the present disclosure, the computing system 104 allows people to meet both online and in-person. The people who have met in person may continue their conversation online in a safe, secure and private manner without having to provide any personally identifiable contact information, such as phone number or email address. Further, the computing system 104 provides a scannable code to potential dates, business partners and potential friends to facilitate an easy way to empower people to 'make the first move' as it reduces the fear of being rejected and also avoids having to give out personal contact information to someone new. Recipients of such a scannable code also benefit, as they are not put into an uncomfortable position when asked to provide a phone number to someone they just met. Furthermore, allowing people to meet in-person first, rather than finding someone inline and then meeting them in-person avoids the problem of discovering that the person doesn't really math their profile i.e., people oftentimes post photos from their younger days, or their personality is dull and boring. Further, the scannable code allows people to easily refer potential dates, business partners and friends to others simply by providing them with a scannable code related to these potential partners.

Further, the computing system 104 allows use of the QR code to profile technology utilized solely in a dating or networking application. Additionally, for the methodologies in which QR codes are shared within dating application realm for the purpose of connecting singles to each other in real life situations. The computing system 104 discloses "QR code linking to user profile" technology. The said technology is implemented in conventional dating applications. However, the conventional dating applications use QR code sharing methods to connect to user profiles via business card or via swipe. The computing system 104 maximizes reach in many other new and creative ways not yet seen in the conventional dating or networking applications. The computing system 104 is having the purpose of connecting persons who meet both online and offline (real life), thus making it a hybrid dating or networking application. The computing system 104 bridges both the dating world (online profiles, virtual presence) and real life, aligning it with the spirit of metaverse methodology. Currently, singles flock to dating applications because it has become "what the singles do". People are likely afraid of rejection. Dating applications provide them a safe place to show interest yet also avoid face-to-face rejection. With this methodology, singles miss everyday opportunities with singles they meet in real life and lean into dating applications hoping they will have a connection on one of their many dates. Dating applications have become overwhelming and do not allow for natural chemistry/attraction to be present. Thus, the computing system 104 allows for a person to approach someone of interest in a way which lessens/avoids rejection.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

I claim:

1. A computing system for facilitating social networking among users, the computing system comprising:
   one or more hardware processors; and
   a memory coupled to the one or more hardware processors, wherein the memory comprises a plurality of modules in the form of programmable instructions executable by the one or more hardware processors, and wherein the plurality of modules comprises:
   a user data receiver module configured to receive a user data from each of a plurality electronic devices associated with a plurality of users;
   a data registration module configured to register the plurality of users in a storage unit based on the received user data,
      wherein the received user data is used to generate a user profile corresponding to the plurality of users,
      wherein, upon registration of the plurality of users, a condensed user profile is generated, wherein the condensed user profile includes a subset of information from the user profile, excluding any personally identifiable information, and wherein the condensed user profile is visible to unregistered users;
   a preference receiver module configured to receive one or more preferences from each of the plurality of electronic devices associated with the registered plurality of users;
   a request receiver module configured to receive a request from a registered user associated with the registered plurality of users to find a potential interested user, wherein the received request comprises at least one of: one or more images and one or more videos of people in-proximity of the registered user, and wherein the at least one of: one or more images and one or more videos are captured using a camera of an electronic device associated with the registered user;
   a data identification module configured to identify one or more potential interested users at real-time based on a location of the user, the received user data, the received one or more preferences and the received request, wherein the one or more potential interested users corresponds to the registered plurality of users, wherein the location of the registered user and locations of the identified one or more potential interested users are same, wherein the location of the user and the location of the identified one or more potential interested users is identified based on a set timer, wherein the set timer is a safety feature to establish predetermined intervals for tracking the location of the plurality of users, ensuring that the location of the plurality of users remain untraceable in the absence of timer setting, wherein the set timer triggers a reminder at predetermined intervals to assess the ongoing intent of each user of the plurality of users to remain tracked, and wherein the one or more potential interested users correspond to one of: a date, a professional and a friend;
   an icon generation module configured to generate one or more Augmented Reality (AR) icons at real-time for the identified one or more potential interested users based on the received user data, the received one or more preferences, a predefined icon information and the received request by using an AR technique, wherein the one or more icons comprise relationship status, age, gender and height, wherein the AR technique generates AR titles, real-time mapping, and sharing, and wherein the AR technique enables the registered user to direct the camera towards the one or more potential interested users in real-time and determine the relationship status of the one or more potential interested user;

a data mapping module configured to superimpose the generated one or more AR icons on the at least one of: one or more images and one or more videos at real-time by using the AR technique; and a data output module configured to output the at least one of: one or more images and one or more videos at real-time on user interface screen of the electronic device associated with the registered user upon superimposing the generated one or more AR icons.

2. The computing system of claim 1, wherein the user data comprises first name, one or more photos, birthdate, vocation, education, physical address, hobbies, age, method of identification and email address of the plurality of users, and wherein the one or more preferences comprise: gender, age, height, distance, location, zodiac sign, one of: smoker and non-smoker, one of: drinker and non-drinker, children, and education level.

3. The computing system of claim 1, further comprising a user profile generation module configured to generate a web page for each of the registered plurality of users by using one or more predefined fields from the user data, wherein the one or more predefined fields comprise: name, age of the plurality of users, Uniform Resource Locator (URL) of application, one of: a Quick Response (QR) code, a bar code and an URL to access the user data and one or more photographs of the plurality of users.

4. The computing system of claim 1, wherein in identifying the one or more potential interested users at real-time based on the location of the user, the received user data, the received one or more preferences and the received request, the data identification module is configured to:

identify one or more users present in proximity of the registered users based on the location of the user and locations of the one or more users, wherein the one or more users correspond to the registered plurality of users;

identify the one or more potential interested users at real-time from the identified one or more users based on the received user data, the received one or more preferences and the received request; and detect the identified one or more potential interested users in the at least one of: one or more images and one or more videos by using a face recognition technique, wherein the generated one or more AR icons are superimposed on the at least one of: one or more images and one or more videos including the detected one or more potential interested users by using the AR technique.

5. The computing system of claim 1, further comprising a QR generation module configured to generate a QR code for each of the plurality of users based on the received user data, wherein the QR code is scanned by other users to obtain the user data, wherein the QR code is shared with the other users via one or more means, and wherein the one or more means comprise: QR cards, allowing the other users to scan the QR code, shirts, car decals, stickers, patches, hats, dog shirts and fake tattoos.

6. The computing system of claim 1, further comprising a connection establishment module configured to:

receive one or more QR codes from one or more other users via one or more means, wherein the one or more other users correspond to the registered plurality of users;

scan the received one or more QR codes to obtain the user data associated with the one or more other users;

transmit a request to each of the one or more other users for adding the one or more others in user connection list upon obtaining the user data;

receive one or more responses to the transmitted request, wherein the one or more responses comprise one of: acceptance of the transmitted request and refusal of the transmitted request; and create a one-on-one communication page to allow communication between the registered user and the one or more other users.

7. The computing system of claim 1, further comprising a hotspot determination module configured to:

receive a request to find one or more hotspots in proximity of the registered user, wherein the request comprises a desired distance range of hotspots, a desired gender, and a timer, and wherein the one or more hotspots are venues where maximum potential interested users are present; and determine the one or more hotspots based on the received request, the location of the registered user and a predefined hotspot information.

8. The computing system of claim 1, further comprising a data access module configured to:

receive a request from the registered user to view the one or more potential interested users in proximity of the registered user, wherein the request comprises location of the registered user;

detect the one or more potential interested users based on the received user data, the received one or more preferences, the received request and one or more locations of the one or more potential interested users;

obtain the user data of the detected one or more potential interested users; and perform one or more operations corresponding to the detected one or more potential interested users upon obtaining the user data, wherein the one or more operations comprise transmit the user data to the one or more potential interested users, transmit a request to each of the one or more potential interested users for adding the one or more others in user connection list, and transmit a QR code in person with the one or more potential interested users.

9. The computing system of claim 1, further comprising a data transmission module configured to:

receive a request from the registered user to view the one or more potential interested users, wherein the request comprises location of the registered user, a timer and a relationship status of the registered user, and wherein the relationship status of the registered user is single;

detect the one or more potential interested users based on the received user data, the received one or more preferences and the received request, wherein the detected one or more potential interested users and distance of each of the detected one or more potential interested users from the registered user is outputted to the electronic device;

select a potential interested user from the detected one or more potential interested users based on one or more inputs of the registered user;

broadcast the user data to the selected potential interested user;

receive a request from the selected potential interested user to meet-up in real;

accept the received request of the selected potential interested user; and transmit the location of the registered user and one or more disclaimers to the selected potential interested user upon accepting the received request.

10. A method for facilitating social networking among users, the method comprising:

receiving, by one or more hardware processors, a user data from each of a plurality electronic devices associated with a plurality of users;

a data registration module configured to register the plurality of users in a storage unit based on the received user data,
wherein the received user data is used to generate a user profile corresponding to the plurality of users,
wherein, upon registration of the plurality of users, a condensed user profile is generated, wherein the condensed user profile includes a subset of information from the user profile, excluding any personally identifiable information, and wherein the condensed user profile is visible to unregistered users;

receiving, by the one or more hardware processors, one or more preferences from each of the plurality electronic devices associated with the registered plurality of users;

receiving, by the one or more hardware processors, a request from a registered user associated with the registered plurality of users to find a potential interested user, wherein the received request comprises at least one of: one or more images and one or more videos of people in-proximity of the registered user, and wherein the at least one of: one or more images and one or more videos are captured using a camera of an electronic device associated with the registered user;

identifying, by the one or more hardware processors, one or more potential interested users at real-time based on a location of the user, the received user data, the received one or more preferences and the received request, wherein the one or more potential interested users corresponds to the registered plurality of users, wherein the location of the registered user and locations of the identified one or more potential interested users are same, wherein the location of the user and the location of the identified one or more potential interested users is identified based on a set timer, wherein the set timer is a safety feature to establish predetermined intervals for tracking the location of the plurality of users, ensuring that the location of the plurality of users remain untraceable in the absence of timer setting, wherein the set timer triggers a reminder at predetermined intervals to assess the ongoing intent of each user of the plurality of users to remain tracked, and wherein the one or more potential interested users correspond to one of: a date, a professional and a friend;

generating, by one or more hardware processors, one or more Augmented Reality (AR) icons at real-time for the identified one or more potential interested users based on the received user data, the received one or more preferences, a predefined icon information and the received request by using an AR technique, wherein the one or more icons comprise relationship status, age, gender and height, wherein the AR technique generates AR titles, real-time mapping, and sharing, and wherein the AR technique enables the registered user to direct the camera towards the one or more potential interested users in real-time and determine the relationship status of the one or more potential interested user;

superimposing, by the one or more hardware processors, the generated one or more AR icons on the at least one of: one or more images and one or more videos at real-time by using the AR technique; and outputting, by the one or more hardware processors, the at least one of: one or more images and one or more videos at real-time on user interface screen of the electronic device associated with the registered user upon superimposing the generated one or more AR icons.

11. The method of claim 10, wherein the user data comprises first name, one or more photos, birthdate, vocation, education, physical address, hobbies, age, method of identification and email address of the plurality of users, and wherein the one or more preferences comprise: gender, age, height, distance, location, zodiac sign, one of: smoker and non-smoker, one of: drinker and non-drinker, children, and education level.

12. The method of claim 10, further comprising generating a web page for each of the registered plurality of users by using one or more predefined fields from the user data, wherein the one or more predefined fields comprise: name, age of the plurality of users, Uniform Resource Locator (URL) of application, one of: a Quick Response (QR) code, a bar code and an URL to access the user data and one or more photographs of the plurality of users.

13. The method of claim 10, wherein identifying the one or more potential interested users at real-time based on the location of the user, the received user data, the received one or more preferences and the received request comprises:

identifying one or more users present in proximity of the registered users based on the location of the user and locations of the one or more users, wherein the one or more users correspond to the registered plurality of users;

identifying the one or more potential interested users at real-time from the identified one or more users based on the received user data, the received one or more preferences and the received request; and detecting the identified one or more potential interested users in the at least one of: one or more images and one or more videos by using a face recognition technique, wherein the generated one or more AR icons are superimposed on the at least one of: one or more images and one or more videos including the detected one or more potential interested users by using the AR technique.

14. The method of claim 10, further comprising generating a QR code for each of the plurality of users based on the received user data, wherein the QR code is scanned by other users to obtain the user data, wherein the QR code is shared with the other users via one or more means, and wherein the one or more means comprise: QR cards, allowing the other users to scan the QR code, shirts, car decals, stickers, patches, hats, dog shirts and fake tattoos.

15. The method of claim 10, further comprising:

receiving one or more QR codes from one or more other users via one or more means, wherein the one or more other users correspond to the registered plurality of users;

scanning the received one or more QR codes to obtain the user data associated with the one or more other users;
transmitting a request to each of the one or more other users for adding the one or more others in user connection list upon obtaining the user data;
receiving one or more responses to the transmitted request, wherein the one or more responses comprise one of: acceptance of the transmitted request and refusal of the transmitted request; and
creating a one-on-one communication page to allow communication between the registered user and the one or more other users.

16. The method of claim 10, further comprising:
receiving a request to find one or more hotspots in proximity of the registered user, wherein the request comprises a desired distance range of hotspots, a desired gender, and a timer, and wherein the one or more hotspots are venues where maximum potential interested users are present; and
determining the one or more hotspots based on the received request, the location of the registered user and a predefined hotspot information.

17. The method of claim 10, further comprising:
receiving a request from the registered user to view the one or more potential interested users in proximity of the registered user, wherein the request comprises location of the registered user;
detecting the one or more potential interested users based on the received user data, the received one or more preferences, the received request and one or more locations of the one or more potential interested users;
obtaining the user data of the detected one or more potential interested users; and
performing one or more operations corresponding to the detected one or more potential interested users upon obtaining the user data, wherein the one or more operations comprise transmit the user data to the one or more potential interested users, transmit a request to each of the one or more potential interested users for adding the one or more others in user connection list, and transmit a QR code in person with the one or more potential interested users.

18. The method of claim 10, further comprising
receiving a request from the registered user to view the one or more potential interested users, wherein the request comprises location of the registered user, a timer and a relationship status of the registered user, and wherein the relationship status of the registered user is single;
detecting the one or more potential interested users based on the received user data, the received one or more preferences and the received request, wherein the detected one or more potential interested users and distance of each of the detected one or more potential interested users from the registered user is outputted to the electronic device;
selecting a potential interested user from the detected one or more potential interested users based on one or more inputs of the registered user;
broadcasting the user data to the selected potential interested user;
receiving a request from the selected potential interested user to meet-up in real;
accepting the received request of the selected potential interested user; and transmitting the location of the registered user and one or more disclaimers to the selected potential interested user upon accepting the received request.

19. A non-transitory computer-readable storage medium having instructions stored therein that, when executed by a hardware processor, cause the processor to perform method steps comprising:
receiving a user data from each of a plurality electronic devices associated with a plurality of users;
a data registration module configured to register the plurality of users in a storage unit based on the received user data,
wherein the received user data is used to generate a user profile corresponding to the plurality of users,
wherein, upon registration of the plurality of users, a condensed user profile is generated, wherein the condensed user profile includes a subset of information from the user profile, excluding any personally identifiable information, and wherein the condensed user profile is visible to unregistered users;
receiving one or more preferences from each of the plurality electronic devices associated with the registered plurality of users;
receiving a request from a registered user associated with the registered plurality of users to find a potential interested user, wherein the received request comprises at least one of: one or more images and one or more videos of people in-proximity of the registered user, and wherein the at least one of: one or more images and one or more videos are captured using a camera of an electronic device associated with the registered user;
identifying one or more potential interested users at real-time based on a location of the user, the received user data, the received one or more preferences and the received request, wherein the one or more potential interested users corresponds to the registered plurality of users, wherein the location of the registered user and locations of the identified one or more potential interested users are same, wherein the location of the user and the location of the identified one or more potential interested users is identified based on a set timer, wherein the set timer is a safety feature to establish predetermined intervals for tracking the location of the plurality of users, ensuring that the location of the plurality of users remain untraceable in the absence of timer setting, wherein the set timer triggers a reminder at predetermined intervals to assess the ongoing intent of each user of the plurality of users to remain tracked, and wherein the one or more potential interested users correspond to one of: a date, a professional and a friend;
generating one or more Augmented Reality (AR) icons at real-time for the identified one or more potential interested users based on the received user data, the received one or more preferences, a predefined icon information and the received request by using an AR technique, wherein the one or more icons comprise relationship status, age, gender and height, wherein the AR technique generates AR titles, real-time mapping, and sharing, and wherein the AR technique enables the registered user to direct the camera towards the one or more potential interested users in real-time and determine the relationship status of the one or more potential interested user;
superimposing the generated one or more AR icons on the at least one of: one or more images and one or more videos at real-time by using the AR technique; and outputting the at least one of: one or more images and one or more videos at real-time on user interface screen of the electronic device associated with the registered user upon superimposing the generated one or more AR icons.

20. The non-transitory computer-readable storage medium of claim 19, wherein the user data comprises first name, one or more photos, birthdate, vocation, education, physical address, hobbies, age, method of identification and email address of the plurality of users.

* * * * *